United States Patent [19]
Suzuki et al.

[11] Patent Number: 4,656,726
[45] Date of Patent: Apr. 14, 1987

[54] DRILLING MACHINE TOOL

[75] Inventors: Mitsuo Suzuki, Kikyomachi; Hitoshi Hashimoto, Iruma; Nobuyasu Ichikawa, Kawagoe; Ichiho Yamada, Niiza; Akira Ozawa, Sayama; Taizo Matsuyama, Seikimachi Kita, all of Japan

[73] Assignee: Honda Giken Kogyo Kabushiki Kaisha, Tokyo, Japan

[21] Appl. No.: 682,212

[22] Filed: Dec. 17, 1984

[30] Foreign Application Priority Data

Dec. 16, 1983 [JP] Japan ............................. 58-236326
May 14, 1984 [JP] Japan ............................. 59-94538
May 14, 1984 [JP] Japan ............................. 59-94539

[51] Int. Cl.⁴ .................................... B23Q 3/157
[52] U.S. Cl. .................................... 29/568; 29/26 A; 29/40; 408/35; 409/80; 409/132
[58] Field of Search ............... 29/568, 26 A, 39, 40; 408/35, 1 R, 3, 88; 409/80, 131, 132, 185, 197, 199, 201, 211, 217

[56] References Cited

U.S. PATENT DOCUMENTS 3,546,774 12/1970 Stofferle et al. .................... 29/568
3,717,417 2/1973 Aubrier ............................ 408/35
4,370,080 1/1983 Goode ............................. 409/200

FOREIGN PATENT DOCUMENTS 2429330 1/1976 Fed. Rep. of Germany ........ 408/35

Primary Examiner—Z. R. Bilinsky
Attorney, Agent, or Firm—Armstrong, Nikaido, Marmelstein & Kubovcik

[57] ABSTRACT

A drilling machine tool is disclosed having a machine tool body with a movable frame which is movable in the three axial directions X, Y and Z, of a rectangular coordinate system. The tool includes a working head provided on said movable frame, said head having at least one drilling spindle thereon, wherein said X direction is the direction in which said movable frame advances to and retreats from a workpiece at the general level of the workpiece, said Y direction is perpendicular to the X direction and said Z direction is generally up and down and is perpendicular to both said X and Y directions; X, Y and Z shafts corresponding to X, Y and Z directions, respectively, each shaft operatively connected with said movable frame for moving said frame in the X, Y and Z directions; a plurality of driving sources, one each corresponding with each of said shafts and operatively connected thereto for driving said shafts; and wherein said frame is movable such that said spindle is operable when inclined with respect to the X axis as well as when said spindle is parallel to the X axis, and said frame is driven along the axial centerline of said spindle in response to said driving sources.

3 Claims, 8 Drawing Figures

4,656,726

DRILLING MACHINE TOOL

BACKGROUND OF THE INVENTION

This invention relates to a drilling machine tool of the type in which a machine tool body has a movable frame which is movable in the three axial directions of a rectangular coordinate system. The movable frame is provided with a working head carrying at least one spindle.

Normally with this type of machine tool the advancing and retreating direction of the movable frame in relation to a workpiece is expressed as the X axis, a direction of travel lateral thereto is expressed as the Y axis, and an upward and downward direction of travel is expressed as the Z axis. The movable frame is positioned by being moved in the Y axial direction and in the Z axial direction to be directed to a point of the workpiece to be drilled. Then, the movable frame is driven in the X axial direction so that the drilling work on the workpiece may be carried out by the spindle of the working head of the movable frame.

This drilling machine tool, however, is inconvenient because the drilling direction is limited to the X axial direction. Thus it is necessary to set the workpiece in a position inclined with respect to the X axial direction in order to drill a hole at an angle on a workpiece. Such an arrangement of the workpiece is troublesome.

A working feed driving mechanism has been proposed which is attached to the movable frame such that an angle thereof may be adjustable, in order to drill a hole at an angle on the workpiece (Japanese Unexamined Patent Publication No. Sho 57-194808.) This arrangement, however, is inconvenient in that it is complicated, since it requires not only a working head feed driving mechanism, but also a moving mechanism for the movable frame provided separately.

SUMMARY OF THE INVENTION

The instant invention has for its object to provide a drilling machine tool which is free from the foregoing inconveniences and can drill holes in a workpiece at any desired angle, by utilizing moving mechanisms for moving the movable frame in the three axial directions, without the necessity of inclining a workpiece and using a work head feed driving mechanism. In a machine tool in which a machine tool body has a movable frame which is movable in three axial directions of a rectangular coordinate system, the movable frame is provided with a working head carrying at least one spindle. The instant invention has an advancing and retracting direction of the movable frame in relation to a workpiece which is expressed as the X-axis. The movable frame is adjustable between a condition in which the spindle is parallel with the X axis and a condition in which the spindle is inclined in relation to the X axis, and is free to be fed along the axial direction of the spindle by so controlling operations of driving sources for respective shafts for moving the movable frame in the three axial directions so as to accord with the direction of the adjusted spindle.

DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF THE PREFERRED EMBODIMENT

Figure 1:
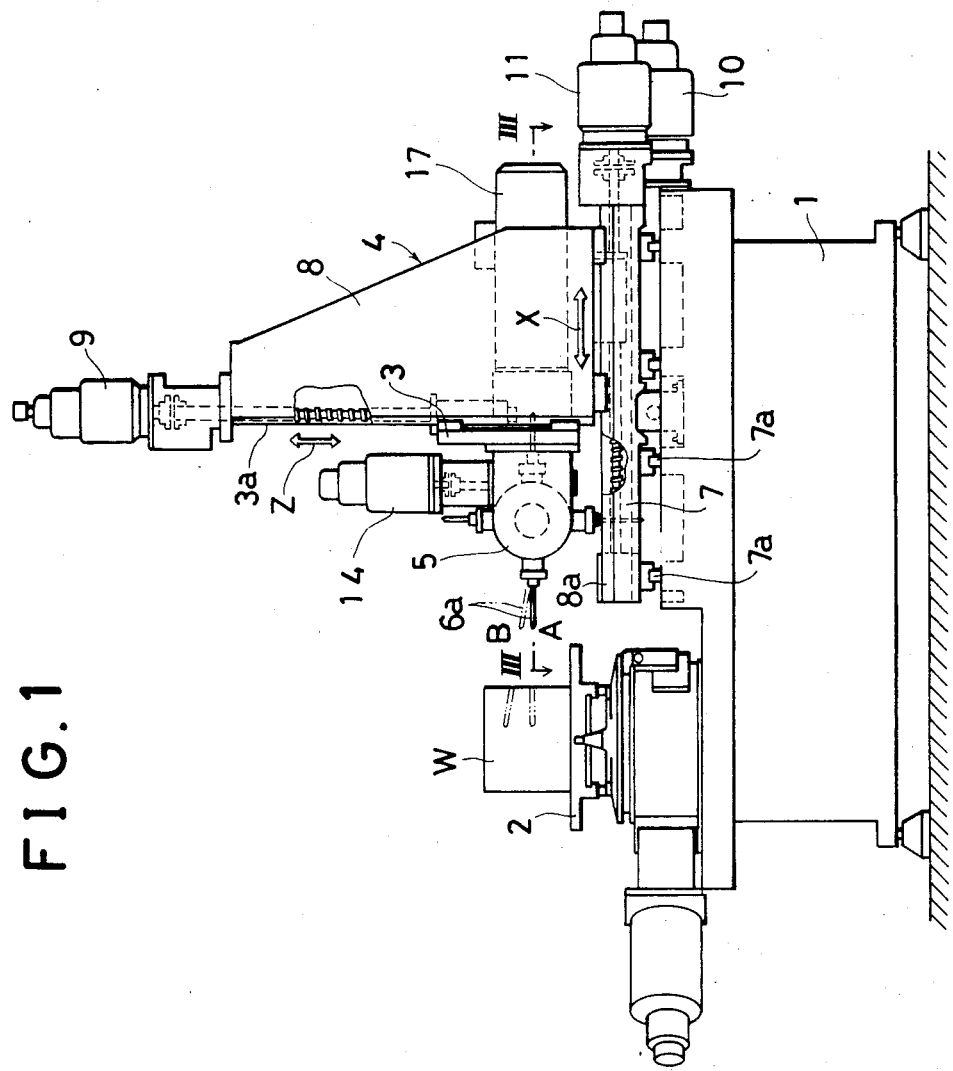
FIG. 1 is a side view of an embodiment of the device of the instant invention.
Figure 2:
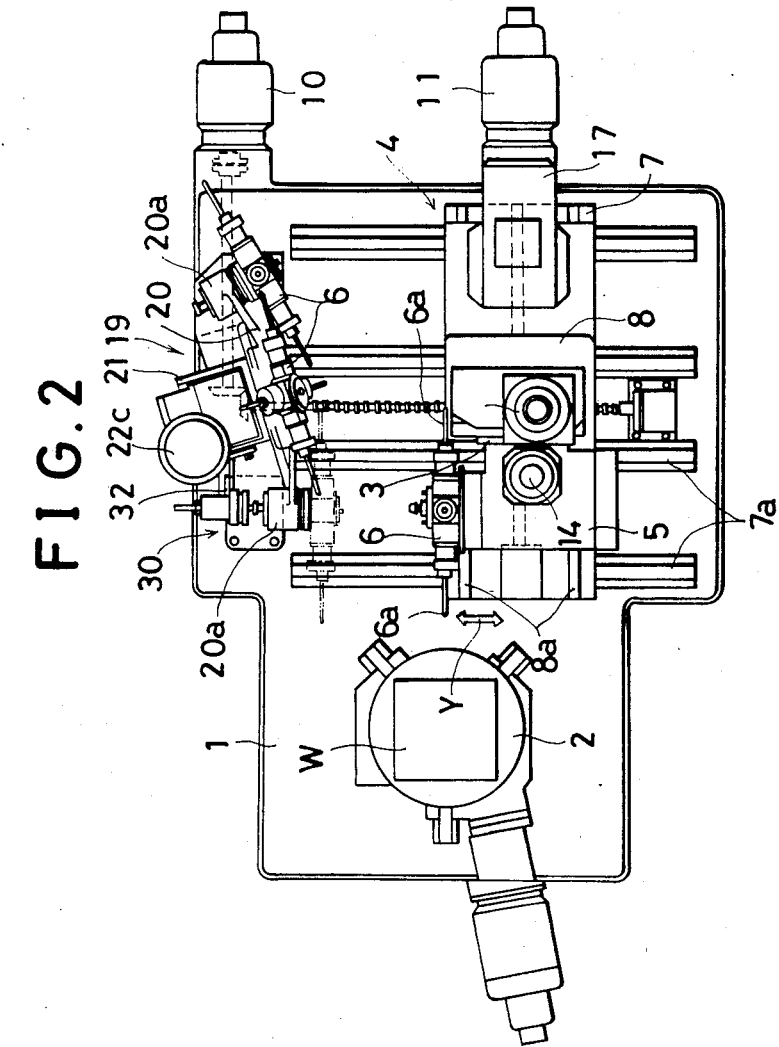
FIG. 2 is a top plan view thereof.

Referring to FIGS. 1 and 2, numeral 1 denotes a machine base, and numeral 2 denotes a jig unit provided on the machine base 1. There is provided on the machine base 1 a machine tool body 4 having a movable frame 3 which is movable in three axial directions of a rectangular coordinate system. The system comprises an X axial direction, that is, an advancing and retreating direction of the movable frame 3 in relation to a workpiece W set on the jig unit 2, a Y axial direction extending laterally, that is, perpendicular to the X axis and a Z axial direction extending upwards and downwards, that is perpendicular to the X and Y axes. A working head 6 is attached through a head holder 5 to the movable frame 3.

More in detail, in the illustrated example, the machine tool body 4 has a table 7 which is slidable in the Y axial direction along guide rails 7a provided on the machine base 1. It also has a column 8 which is slidable in the X axial direction along guide rails 8a provided on the table 7. Movable frame 3 is slidable in the Z axial direction along guide rails 3a provided on the column 8. Driving sources 9, 10, 11 comprising respective servo motors are connected through respective guide screws 9a, 10a and 11a to the movable frame 3, the table 7 and the column 8, respectively so that the movable frame 3 may be given a movement in the Z axial direction by operation of the Z axial driving source 9, a movement in the Y axial direction through the table 7 by operation of the Y axial driving source 10, and a movement in the X axial direction through the column 8 by operation of the X axial driving source 11.

Figure 4:
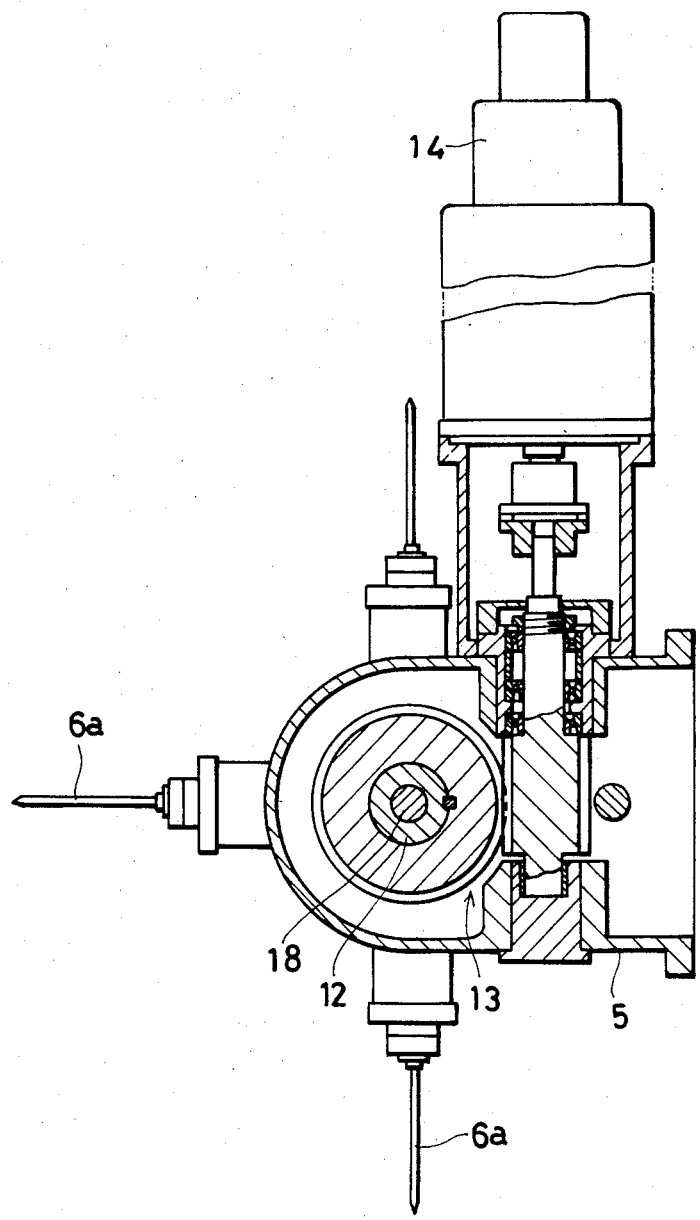
FIG. 4 is a sectional view taken along the line IV—IV of FIG. 3.
Figure 5:
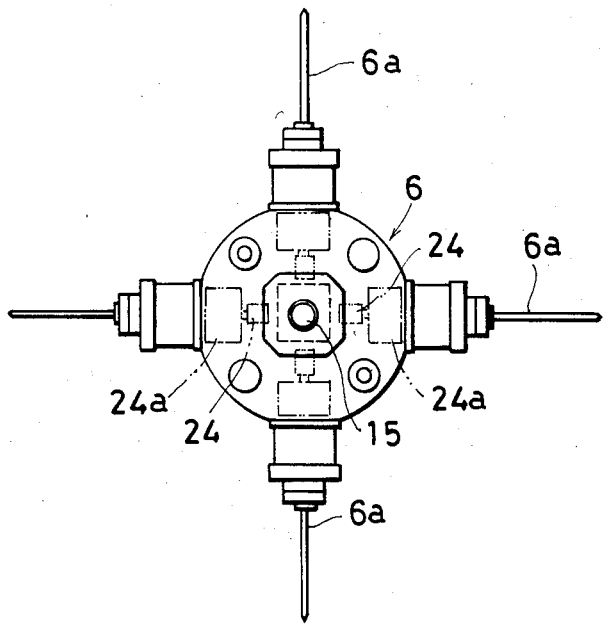
FIG. 5 is a front view of a turret head thereof viewed from a head holder side.

As shown clearly in FIG. 5, in the illustrated example, the working unit 6 comprises a turret head carrying plural spindles 6a on the periphery thereof. As shown clearly in FIGS. 3 and 4, a working unit 6 is attached coaxially to an index shaft 12 which is provided on the head holder 5 so as to extend perpendicularly to the X axis and in parallel with the Y axis. A driving source 14 for indexing is connected to the shaft 12 through a worm gear mechanism 13 and is composed of a servo motor so that the working unit 6 may be turnable for adjustment of any spindle to any desired angular position about the shaft 12 by the driving source 14. Thus, the working unit 6 is designed to not only perform the usual index turning by which any desired one selected from the plural spindles 6a becomes parallel with the X axial direction as shown by A in FIG. 1, but also can be angularly adjusted such that the selected spindle 6a is inclined by any desired angle in relation to the X axis as shown by FIG. 1.

Each of the spindles 6a is connected through each corresponding bevel gear 16 to an input shaft 15, which is provided to pass through a surface wall of the working head 6 and is connected to the index shaft 12. A motor 17 is attached to the movable frame 3 and a driving shaft 18 connected to the motor 17 is provided in the index shaft 12. If the working head 6 is mounted to the index shaft 12, the input shaft 15 may be in spline engagement with the driving shaft 18 and thereby each spindle 6a may be given a rotary operation by the spindle motor 17.

According to this invention, the driving sources 9, 10, 11 for moving the movable frame 3 in the three axial directions X, Y, Z are arranged to be controlled in their respective operations so as to accord with the direction of the working head 6 so that the movable frame 3 may be driven in the axial direction of the selected spindle 6a.

More in detail, if the direction of the working head 6, that is, the direction of the selected spindle 6a thereof, is adjusted to be inclined by turning the index shaft 12 which is parallel with the Y axis as in the embodying example, the axial line of the selected spindle 6a is moved in a plane of the X-Z coordinates. Accordingly, after the movable frame 3 is set in position in the three axial directions by the respective driving sources 9, 10, 11 so as to face the workpiece W, the driving sources 9, 11 for the Z axis and the X axis are operated at their respective speeds corresponding to respective components in the Z axial direction and in the X axial direction of a directional vector of the axial line of the spindle 6a, so that the movable frame 3 can be driven in the direction which is the same as the axial direction of the spindle 6a for effecting a desired angled drilling work.

Alternatively, an industrial robot wrist technique may be applied to the working head 6, so that the direction of the spindle 6a thereof can be changed in the three axial directions.

In this case, any desired change in the direction thereof in the three dimensions can be effected by operating the respective driving sources 9, 10, 11 at respective speeds corresponding to respective components in three axial directions of a directional vector of the axial line thereof.

The above has been set forth with respect to the whole construction of the instant invention and the operation thereof. In using working head 6, a turret head type as mentioned above, it is desirable that a replacement thereof with another one is carried out automatically and at a high efficiency. For meeting this desire, in the illustrated example, a head magazine 19 is provided on one lateral side of the machine tool body 4, that is, one one side thereof in the Y axial direction facing the head holder. The working head 6 is detachably attached, at a position on one side in the Y axial direction of the head holder 5, to the index shaft 12 which is parallel with the Y axis so that the working head 6 may be replaced with another one between the head holder 5 and the magazine 19 after the movable frame 3 is moved to one side in the Y axial direction.

Figure 3:
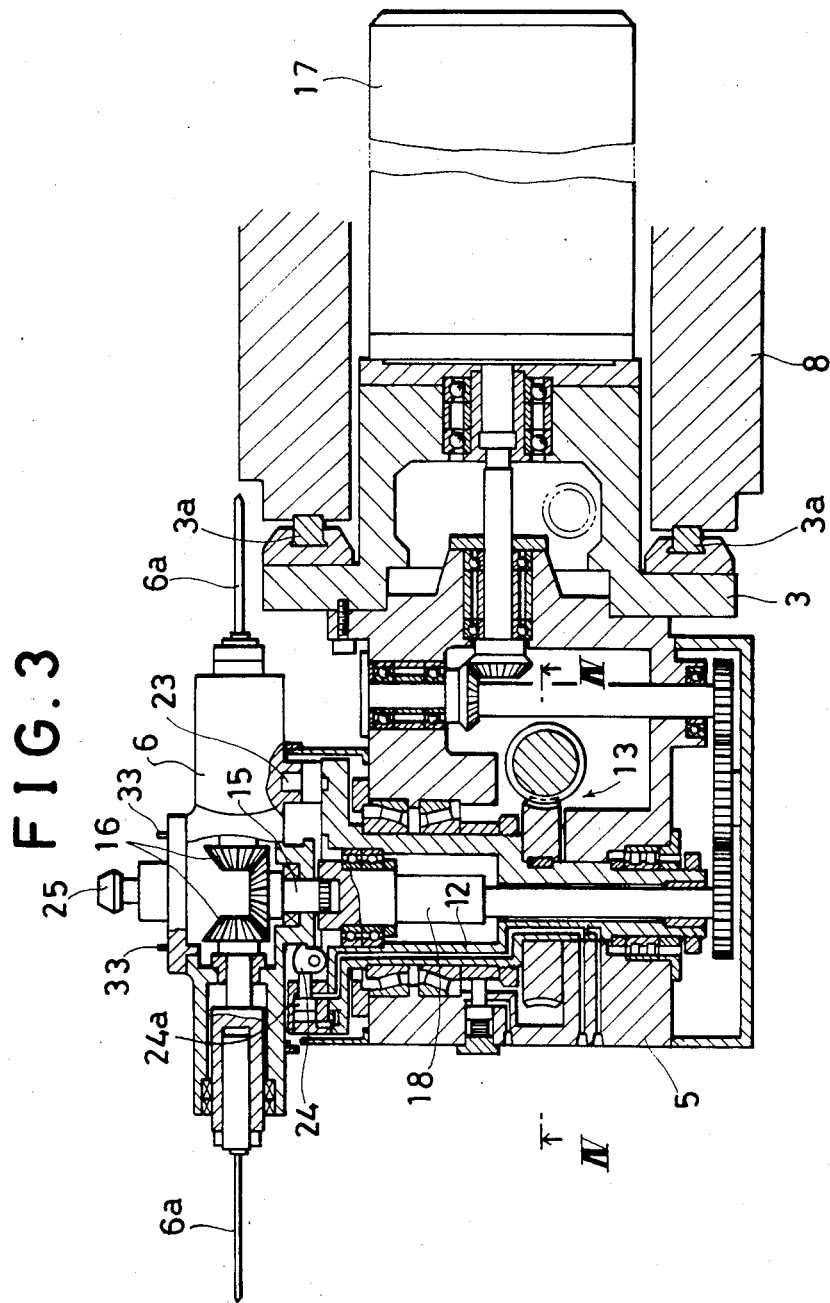
FIG. 3 is a sectional view taken along the line III—III of FIG. 1.
Figure 6:
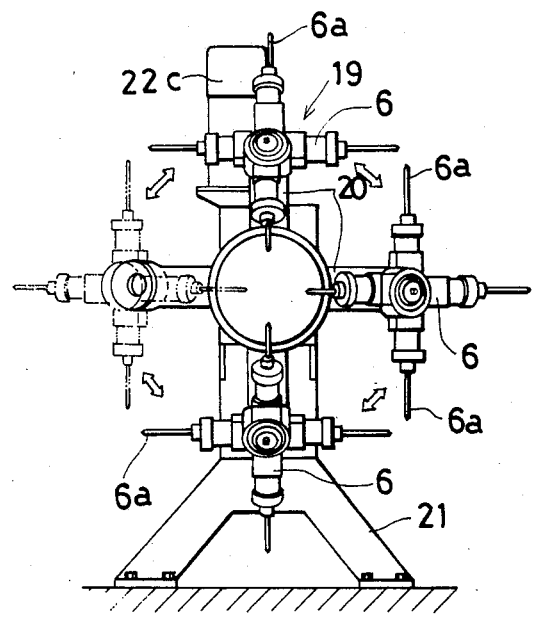
FIG. 6 is a front view of a head magazine thereof viewed from a front side in its axial direction.
Figure 7:
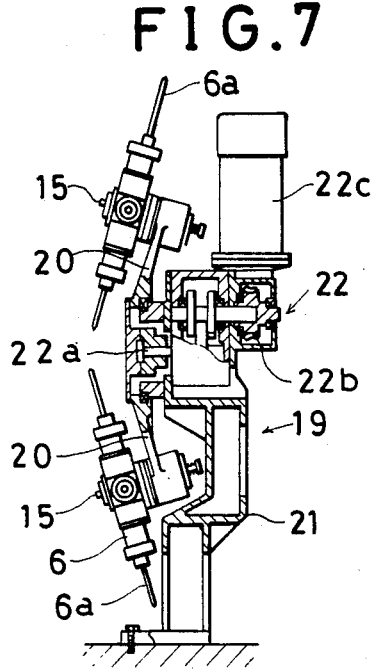
FIG. 7 is a side view, partly in section, of the same.

More in detail, as shown clearly in FIGS. 6 and 7, the magazine 19 is provided with radially extending plural supporting arms 20 for serving to detachably hold respective working heads 6, except for one arm 20 which is not holding a working head 6. The magazine 19 is supported on a frame base 21, which is provided on the machine base 1 at a position on one side in the Y axial direction of the machine base 1, so as to be turnable about its own axis which is nearly parallel with the Y axis. There is provided an index mechanism 22 comprising an index shaft 22a connected to the magazine 19 coaxially therewith and a driving source 22c such as a servo motor or the like connected to the shaft 22a through a gear train 22b, so that any desired one of supporting arms 20 may be so selected by the mechanism 22, and moved to a replacing position extending along the Y axial direction of the head holder 5. Additionally, as shown in FIG. 3, the working head 6 is set in position and is fixed detachably to the shaft 12 by means of plural positioning pins 23 and clamp members 24. Pins 23 and clamp members 24 are provided respectively on an attaching base formed on one end portion in the Y axial direction of the index shaft 12, so that the working head 6 may be replaced with another one between the head holder 5 and the supporting arm 20 which has been selected at the replacement position, after the head holder 5 is moved by the movable frame 3 towards one side in the Y axial direction. Numeral 24a denotes an operation cylinder of the clamp member 24.

Figure 8:
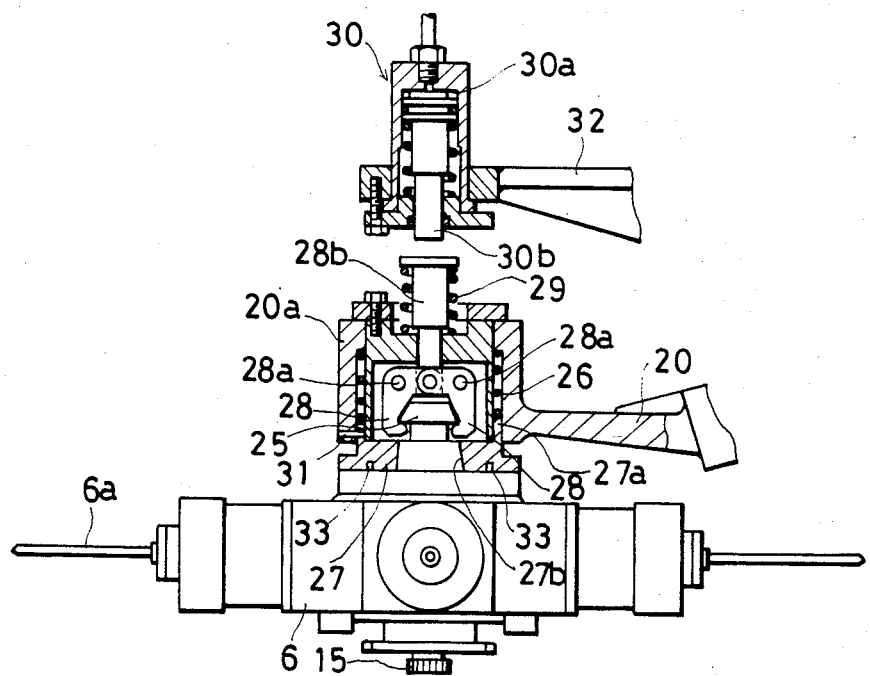
FIG. 8 is a sectional top plan view of a part of a supporting arm at a replacement position thereof.

As shown in FIG. 8, each working head 6 is constructed so as to be provided with a projection 25 on such a side surface on one side in the Y axial direction that is opposite to its surface for connecting to the index shaft 12. Each supporting arm 20 is provided with a head receiving seat 27 which can be inserted with the projection 25 and is urged by spring 26 in the other side direction in the Y axial line, and a clamp arm means 28 which is located in rear of the receiving seat 27 and serves to clamp the projection 25, and in addition is always urged by a spring 29 towards its closing side. In addition, there is provided at the replacement position an unclamping driving source 30 which serves to push the clamp arm 28 of the supporting arm 20 selected at that position towards its opening side against the action of the spring 29.

More in detail, the receiving seat 27 is so constructed that its cylindrical portion 27a projecting rearwards therefrom is mounted in and supported by a tubular portion 20a formed on a forward end portion of the supporting arm 20, and is prevented from turning in relation to the tubular portion 20a by means of a pin 31 inserted therein. It is moved slidably along the tubular portion 20a against the action of the spring 26, and a hole 27b is made in the receiving seat 27 so that the projection 25 of the working head 6 may be detachably inserted therein.

The clamp arm means 28 comprises a pair of right and left arms provided in the rear of the receiving seat 27, and the two clamp arms 28, 28 are pivotally supported on shafts 28a, 28a provided at their respective base end portions, on the tubular portion 20a. The two-clamp arms 28, 28 are pivotally-connected in common to an operation rod 28b extending rearwards from the tubular portion 20a, through their common shaft passing through their operation end portions extending inwards from their base end portions. Clamp arms 28, 28 are always urged towards their closing side through the rod 28b by a spring 29 urging the operating rod 28b rearwards, so that, if the projections 25 of the working head 6 passed through the hole 27b of the receiving seat 27, the head 6 is pushed inward together with the receiving seat 27 against the action of the spring 26, the two clamp arms 28, 28 are pushed open against the action of the spring 29 by a tapered forward end portion of the projection 25, and thereby the projection 25 is held clamped by the two clamp arms 28, 28 at its shoulder portion on a rear end of the tapered portion thereof.

The unclamp driving source 30 comprises an oil pressure cylinder 30a fixedly provided on a bracket 32 which, in turn, is fixedly provided on the frame base 21. Piston rod 30b of cylinder 30a is set in position such that the same faces the operation rod 28b on the supporting arm 20 which is selected and moved to the replacing position, so that in the piston rod 30b is pushed to advance, the rod 28b may be pushed thereby to move against the action of the spring 29 for opening the two clamp members 28, 28 to unclamp them.

Referring to the drawings, numeral 33 denotes a pin provided on the surface of the working head 6 for engaging the receiving seat 27 facing the same and serving to prevent the same from turning.

Next, the operation of the above arrangement will be explained as follows:

The working head 6, after use, is moved laterally towards the replacing position, under the condition that the same is attached to the head holder 5, by moving the movable frame 3 towards one side in the Y axial direction. In the course of this lateral movement of the working head 6, the projection 25 thereof is inserted through the hole 27b of the receiving seat 27 of the supporting arm 20 being in an empty condition and waiting at the replacing position, and is held by the clamp arms 28, 28. On this occasion, a shock to the supporting arm 20 caused by the lateral movement of the head holder 5 can be absorbed by the spring 26. Thereafter, the clamp member 24 of the head holder 5 is released, and the head holder 5 is retracted a little from the replacing position towards the other side in the Y axial direction, and any desired one of the working heads 6 carried by the supporting arms 20 that is to be next used is selectively moved to the replacing position by operation of the index mechanism 22 of the head magazine 19. Thereafter, the head holder 5 is again advanced to the replacing position, and the unclamp driving source 30 is operated to cause the clamp arms 28, 28 of the supporting arm 20 to open against the action of the spring 29. Whereupon, the receiving seat 27 of the supporting arm 20 is urged by the spring 26 towards the head holder 5, so that the working head 6 is brought into close contact with the attaching seat of the index shaft 12 of the head holder 5. Then, the working head 6 is clamped by the clamp member 24 of the head holder 5, and thereafter the movable frame 3 is laterally moved towards the other side in the Y axial direction, so that the head holder 5 may be returned to the original position to be ready for the next working operation.

In the illustrated example, each supporting arm 20 of the head magazine 19 is so provided as to be inclined in relation to a horizontal plane which lies in the Y axis, and the axial line of the magazine 19 is slightly inclined in relation to the X axis and the Y axis, so that the axial line of the working head 6 carried by the corresponding supporting arm 20 may become in alignment with the Y axis at the replacing position, but may be displaced from the replacing position at any other position than the replacing position, and thereby the movement in the Y axis direction of the machine tool body 4 is not interrupted.

Thus, according to this invention, the working head is arranged to be adjustable in its direction, and the movable frame is so adjusted as to be driven in the axial direction of the adjusted spindle provided on the working head by so controlling the operations of the respective driving sources for the respective shafts for moving the movable frame in three axis directions so that a hole drilled at an angle can be produced at a good working property, without need of inclining a workpiece or using another feed driving mechanism for the working head.

It should be understood that the specific form of the invention hereinabove described is intended to be representative only, as certain modifications within the scope of these teachings will be apparent to those skilled in the art.

Accordingly, reference should be made to the following claims in determining the full scope of the invention.

We claim:

1. A drilling machine tool having a machine tool body with a movable frame which is movable in the three axial directions X, Y, and Z, of a rectangular coordinate system comprising:

a working head provided on said movable frame, said head having at least one drilling spindle thereon, wherein said X direction is the direction in which said movable frame advances to and retreats from a workpiece at the general level of the workpiece, said Y direction is perpendicular to the X direction and said Z direction is generally up and down and is perpendicular to both said X and Y directions;

X, Y and Z shafts corresponding to X, Y and Z directions, respectively, each shaft operatively connected with said movable frame for moving said frame in the X, Y and Z directions;

a plurality of driving sources, one each corresponding with each of said shafts and operatively connected thereto for driving said shafts;

wherein said frame is movable such that said spindle is operable when inclined with respect to the X axis as well as when said spindle is parallel to the X axis, and said frame is driven along the axis centerline of said spindle, even when said spindle is inclined with respect to the X axis, in response to said driving sources; and wherein said working head includes,
a turret head having a plurality of spindles on the outer periphery thereof,
an index shaft at right angles to said X axis and coaxially connected to said turret, and
a head holder attached to said movable frame for supporting said turret head, such that the working head is adjustable to any desired angular position about said index shaft.

2. The drilling machine of claim 1, wherein:

said index shaft is parallel to the Y axis and the working head is detachably attached to the index shaft on one side of said head holder;

a head magazine disposed on the machine tool body in facing relationship with said head holder for engagement therewith;

a plurality of supporting arms extending radially from said head magazine, each arm serving to detachably hold the working head; and an index mechanism which selectively turns said magazine to move a selected arm into a replacing position wherein said selected arm faces said head holder in the Y axial direction such that the head is replaceable from the head holder to the selected arm and vice-versa, when said movable frame is moved toward said magazine and positioned for replacing the head.

3. The drilling machine of claim 2, including:

a projection provided on one side surface of said working head opposite the side surface where said working head is connected to said index shaft;

a head receiving seat provided for each of said supporting arms, said head receiving seat being insertable with said projection;

a spring biasing said head receiving seat toward said head holder;

clamp arm means disposed at the rear of said receiving seat for clamping onto said projection;

a clamp spring biasing said clamp arm means to a closed position; and an unclamping driving source positioned at the replacing position for pushing the clamp arm means on the selected supporting arm toward an open position against the bias of said clamp spring.

* * * * *